United States Patent
Robins et al.

(10) Patent No.: US 6,903,767 B2
(45) Date of Patent: Jun. 7, 2005

(54) METHOD AND APPARATUS FOR INITIATING DATA CAPTURE IN A DIGITAL CAMERA BY TEXT RECOGNITION

(75) Inventors: Mark N. Robins, Greeley, CO (US); Heather N Bean, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 775 days.

(21) Appl. No.: 09/827,152

(22) Filed: Apr. 5, 2001

(65) Prior Publication Data
US 2004/0201720 A1 Oct. 14, 2004

(51) Int. Cl.[7] ............................................. H04N 5/262
(52) U.S. Cl. .................. 348/239; 348/207.99; 382/321; 715/863
(58) Field of Search ........................... 348/239, 207.99, 348/222.1; 382/321, 324, 313; 715/863

(56) References Cited

U.S. PATENT DOCUMENTS

| 5,392,447 | A | * | 2/1995 | Schlack et al. | ............. | 715/863 |
| 2002/0011558 | A1 | * | 1/2002 | Neukermans et al. | ........ | 250/236 |
| 2002/0131636 | A1 | * | 9/2002 | Hou | .......................... | 382/181 |
| 2002/0160805 | A1 | * | 10/2002 | Laitinen et al. | ............. | 455/550 |

FOREIGN PATENT DOCUMENTS

EP          1014338 A1    6/2000    ........... G10L/15/26

* cited by examiner

Primary Examiner—Tuan Ho
Assistant Examiner—Heather R. Long
(74) Attorney, Agent, or Firm—Thomas M. Croft

(57) ABSTRACT

A digital camera takes photographs of printed material upon recognition of a specified text pattern. In one exemplary embodiment of the present invention, the process of photographing printed material based on text pattern recognition is partially manual. In a second embodiment of the present invention, the process is highly automated.

24 Claims, 4 Drawing Sheets

METHOD AND APPARATUS FOR INITIATING DATA CAPTURE IN A DIGITAL CAMERA BY TEXT RECOGNITION

FIELD OF THE INVENTION

The present invention relates generally to digital cameras and, more specifically, to a method and associated apparatus for initiating data capture in a digital camera by the recognition of text patterns such as words or phrases.

BACKGROUND OF THE INVENTION

Digital cameras provide powerful features and convenience to hobbyists and professionals alike. In applications such as genealogy, for example, genealogists often search through large books or stacks of records for relevant information. Once relevant information is found on a particular page, a genealogist may take a photograph of the page using a digital camera.

Digital photography provides several advantages over traditional silver-emulsion-film photography. First, a user can see immediately on the display of the digital camera whether or not the photograph is acceptable. Secondly, the photograph is created directly in digital format and can be used immediately in printed reports, photo albums, Web pages, or e-mail messages. Although the foregoing advantages are significant, the task of searching through the pages of a book or a stack of records looking for relevant information can still be tedious and time consuming. Often, the search centers on finding a specific word such as a surname or an important phrase. Unfortunately, prior-art digital cameras do not aid the user in finding text patterns on a printed page. The task of searching for relevant pages is left entirely to the user.

It is thus apparent that there is a need in the art for an improved method or apparatus for locating relevant pages of printed material and digitally photographing them easily and efficiently.

SUMMARY OF THE INVENTION

According to one aspect of the invention, a method is provided for initiating data capture in a digital camera upon recognition of a text pattern. In one embodiment, the method comprises a manual two-pass approach. In another embodiment, the method is highly automated. According to another aspect of the invention, a digital camera for carrying out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
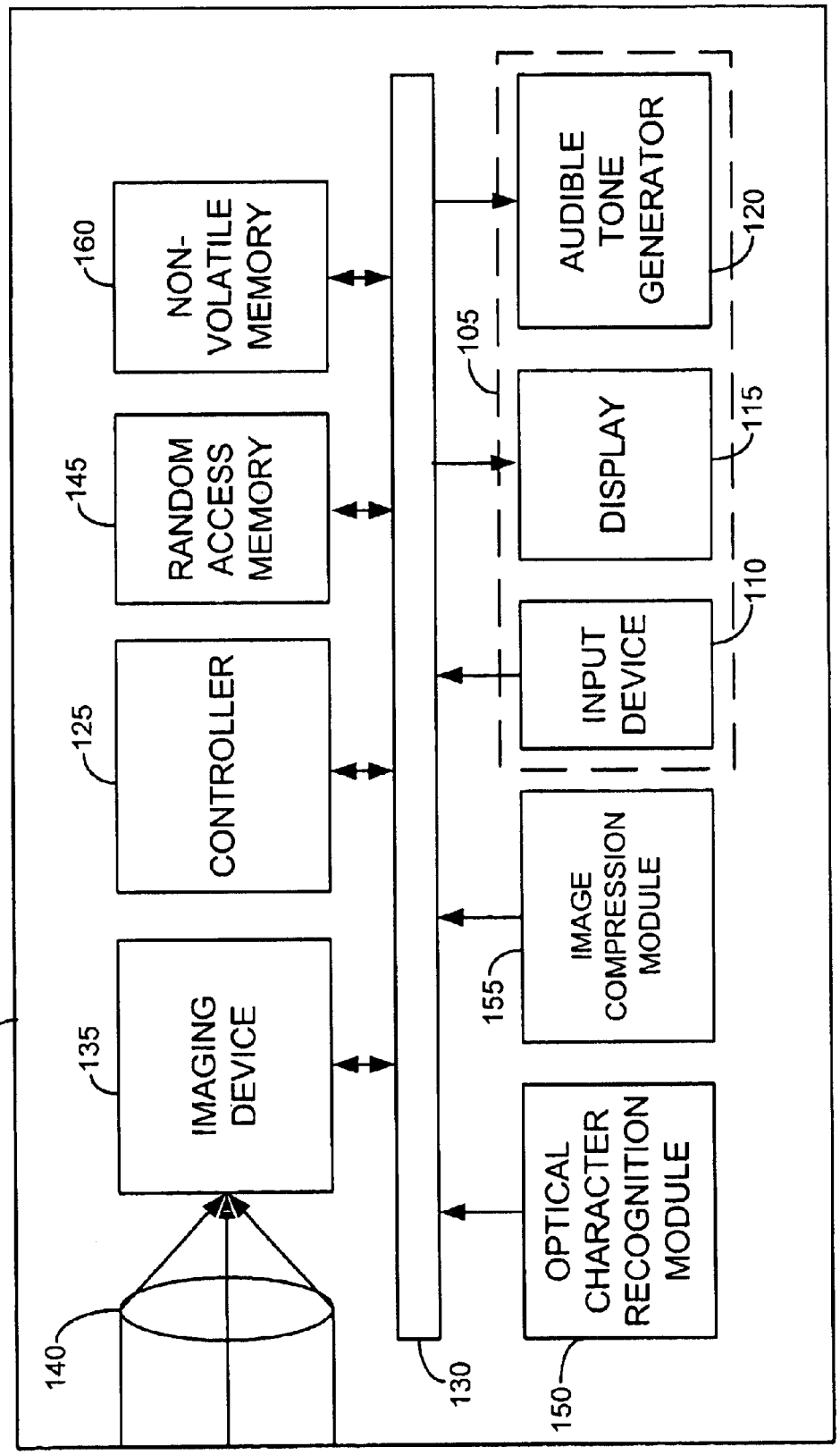
FIG. 1 is a functional block diagram of a digital camera in accordance with the present invention.

FIG. 1 is a functional block diagram of a digital camera 100 in accordance with one embodiment of the present invention. In FIG. 1, user interface 105 comprises input device 110, display 115, and optional audible tone generator 120. Input device 110 sends commands to controller 125 over data bus 130 to specify the modes of operation of digital camera 100 and acts as a source for text input. User interface 105 provides feedback to users via display 115 and optional audible tone generator 120. Imaging device 135 converts an optical image received from optical system 140 to a digital image. The digital image may be stored temporarily in optional random access memory (RAM) 145. Optical character recognition (OCR) module 150 converts digital images of printed material to text. Image compression module 155 compresses digital images to reduce their storage requirements. Non-volatile memory 160 provides long-term storage of digital representations. Throughout this detailed description, the term "digital representation" will be used to denote a text file, a digital image (compressed or uncompressed), a message digest, check sum, or any other digital representation of a target scene or any combination thereof.

Figure 2:
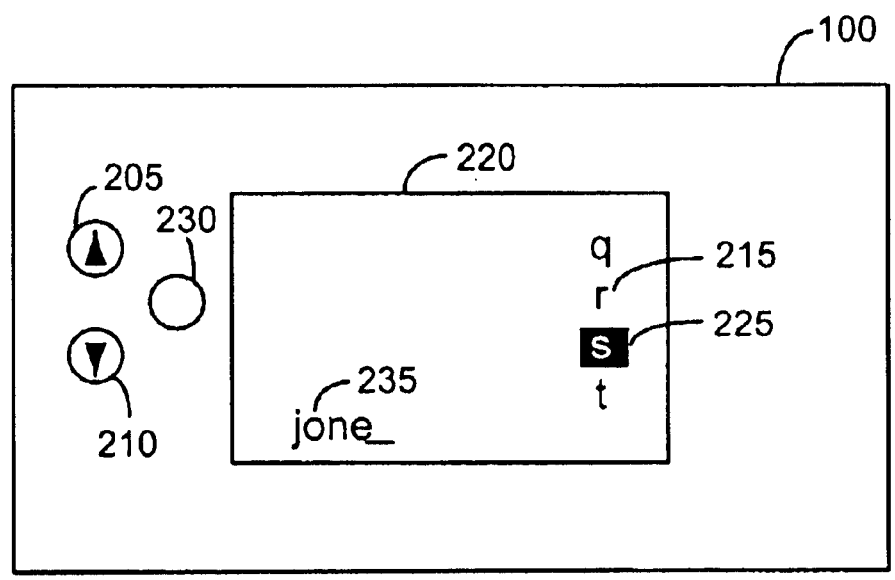
FIG. 2 is an illustration of a text-input user interface device for a digital camera in accordance with one embodiment of the present invention.

In a typical implementation, imaging device 135 comprises a charge-coupled device (CCD), an analog-to-digital converter (A/D), a gain control, and a digital signal processor (DSP), as is well known in the art (not shown in FIG. 1). Input device 110 typically comprises one or more buttons for selecting modes or acquiring text input. For example, FIG. 2 shows one method in which a text pattern may be acquired in digital camera 100, which may not include an alphanumeric keypad. Hereinafter, the term "text pattern" will be used to denote a textual string comprising one or more alphanumeric characters, including spaces. Scroll buttons 205 and 210 control which portion of alphanumeric character list 215 is visible on display 220. Cursor 225 indicates which alphanumeric character is currently selectable. Pressing select button 230 adds the currently highlighted character to text pattern 235 to be searched. The same process of scrolling using scroll buttons 205 and 210 and selecting characters using select button 230 is repeated for each character in text pattern 235 until the entire text pattern has been specified. Optionally, user interface 105 may include a microphone and a speech recognizer for accepting voice input (not shown in FIG. 1). One example of how voice input may be incorporated in a digital camera may be found in published European Patent Application EP-1014338A1. Yet another method for acquiring a text pattern in digital camera 100 is to retrieve a previously saved text pattern. For example, a text pattern may be read from a text file, or the previous text pattern for which a search was performed may be loaded by default until overridden by new input. Audible tone generator 120 is an optional component of digital camera 100 and has been included in FIG. 1 for the purpose of illustration only. In some implementations, a flashing or persistent light, a vibrator, or other method of providing feedback to users may be preferable to an audible tone. Non-volatile memory 160 is typically flash memory. In some implementations, non-volatile memory 160 may be of the removable type, such as a memory stick or magnetic disk. Optical character recognition module 150 may be implemented in hardware, software, firmware, or a combination thereof. Image compression module 155, which may be implemented in hardware, software, firmware, or a combination thereof, typically produces images in the popular JPEG format.

Figure 3:
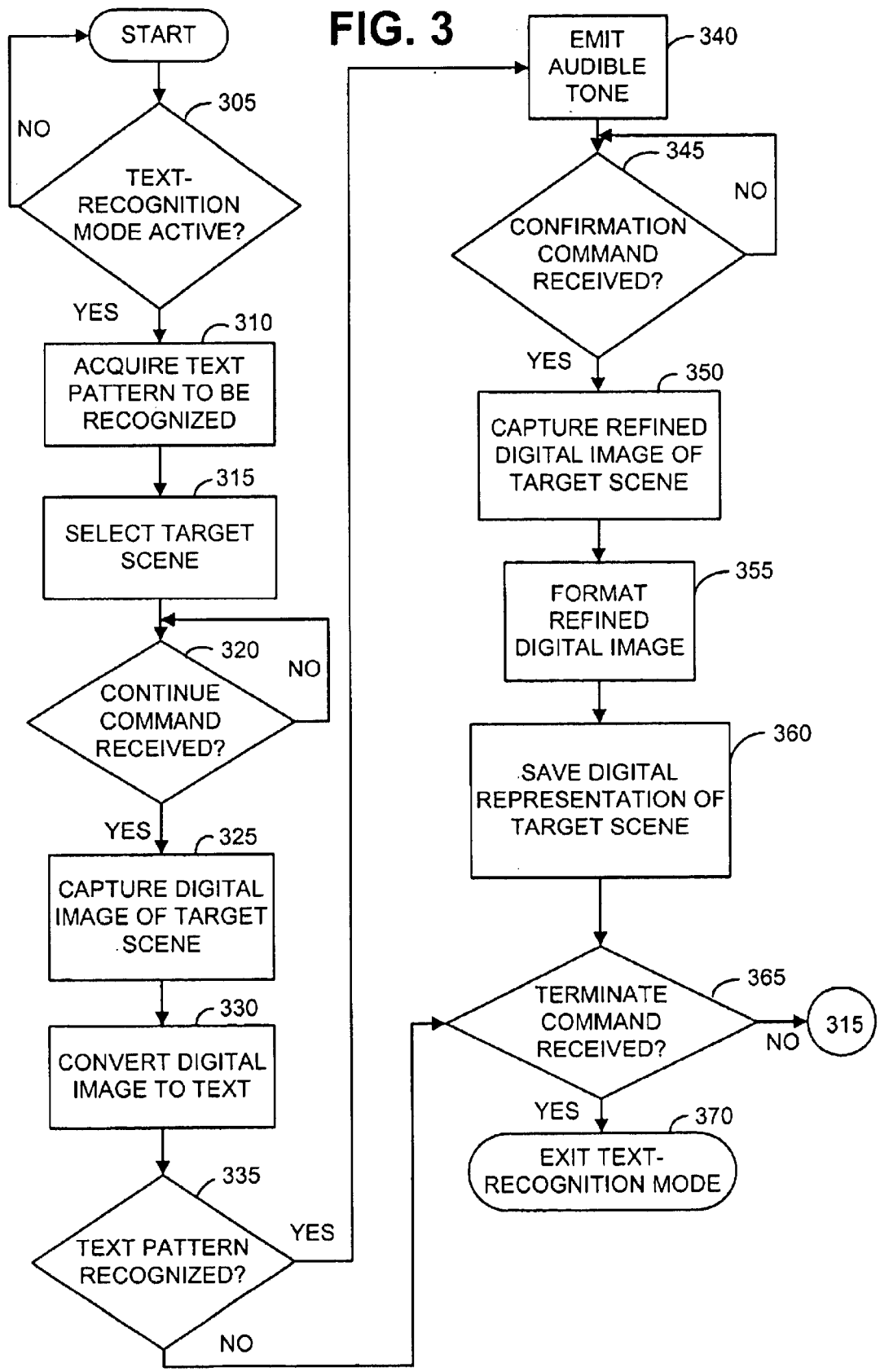
FIG. 3 is a flowchart of the operation of the digital camera shown in FIG. 1 in accordance with one embodiment of the present invention.

FIG. 3 is a flowchart illustrating the operation of digital camera 100 in accordance with one exemplary embodiment of the present invention. At 305, controller 125 determines whether or not text-recognition mode has been activated. If so, a text pattern to be recognized is acquired at 310 by one or more of the methods previously described. A target scene at which to aim digital camera 100 is selected at 315. In typical applications, the target scene is a page in a book or other printed material compatible with OCR technology. Upon receipt of a continue command from user interface 105 at 320, imaging device 135 produces a digital image, which may be stored temporarily in RAM 145, at 325. OCR module 150 converts the digital image to a text file at 330. The text file may also be stored temporarily in RAM 145. At 335, controller 125 searches for the text pattern that was acquired at 310. If the text pattern is recognized, an audible tone is emitted at 340. Upon receipt of a confirmation command at 345, imaging device 135 produces a refined digital image at 350 of whatever target scene is currently being received from optical system 140. The purpose of this arrangement is to provide both a quick search to determine whether a text pattern is present on a printed page and a subsequent follow-up second pass in which a user may align digital camera 100 more precisely to take a final photograph of the page. However, the confirmation command at 345 may be replaced by different techniques in other embodiments of the present invention. For example, the refined digital image may be captured automatically after a predetermined delay following the recognition of the text pattern at 335.

Controller 125 determines at 355 in what format output data should be saved in non-volatile memory 160. Depending on which format or formats have been specified, image compression (e.g., for JPEG output), OCR, or other format conversion may need to be performed on the refined digital image at 355. At 360, a digital representation of the target scene is saved in non-volatile memory 160. At 365, controller 125 checks for a termination command. If none is received, control returns to 315, where a new target scene is selected. If a termination command is received, digital camera 100 exits text-recognition mode at 370. If the text pattern is not recognized at 335, control proceeds to 365.

The embodiment described in connection with FIG. 3 exemplifies a manual two-pass approach to the process of text recognition and picture taking. Specifically, the continue command at 320 and the confirmation command at 345 are intended to give the user maximum control over the final digital representation saved, but such a manual approach is by no means the only manner in which the present invention may be embodied. For example, a greater degree of automation may be introduced to speed up the taking of multiple photographs and to provide greater convenience to the user.

Figure 4:
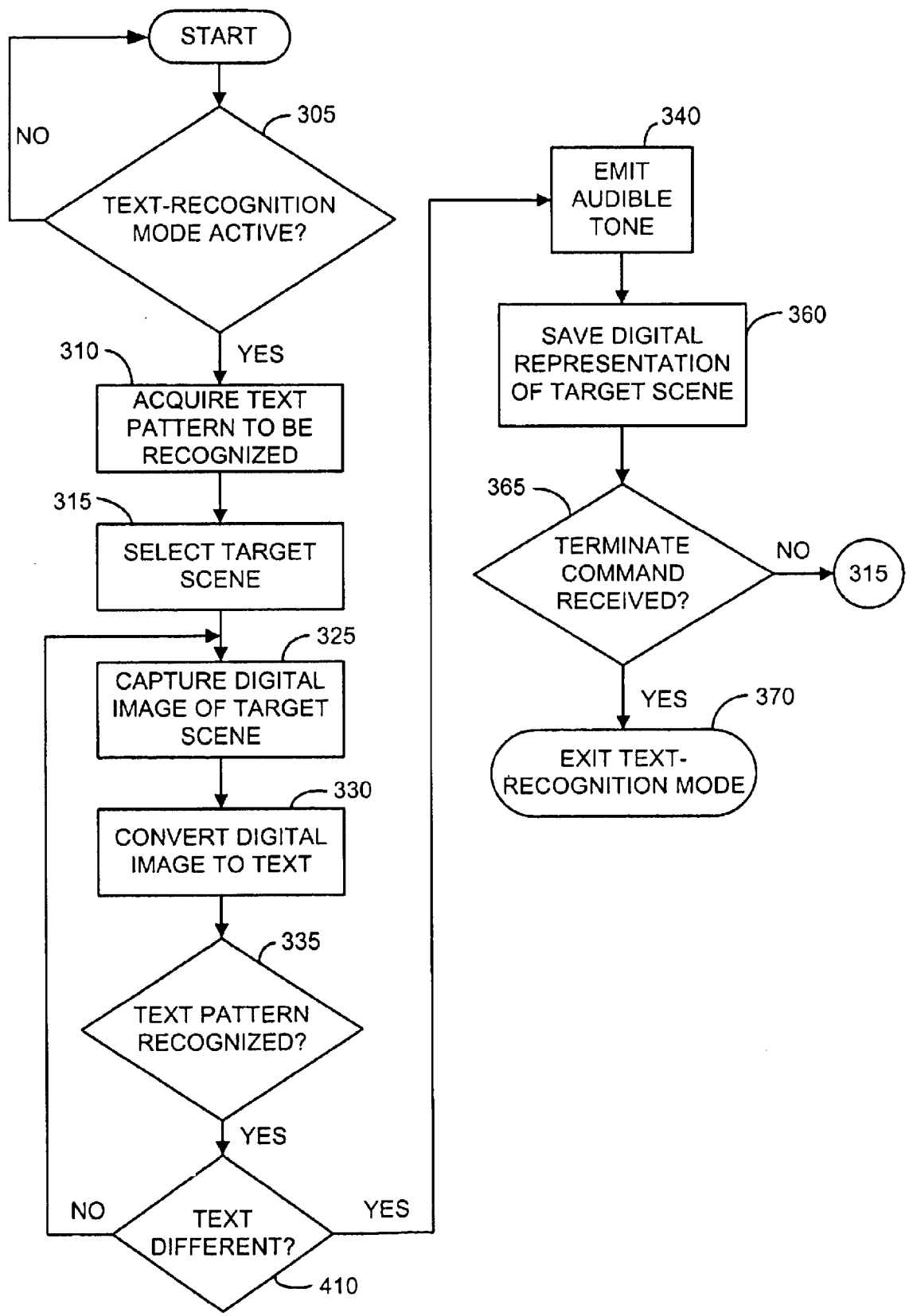
FIG. 4 is a flowchart of the operation of the digital camera of FIG. 1 in accordance with another embodiment of the present invention.

FIG. 4 is a flowchart illustrating the operation of digital camera 100 in accordance with another embodiment of the present invention. The method of operation shown in FIG. 4 incorporates a higher degree of automation than that shown in FIG. 3. In FIG. 4, text-recognition mode is activated at 305, a text pattern to be recognized is acquired at 310, and a target scene is selected at 315, as described in connection with FIG. 3. As soon as text-recognition mode becomes active, or, optionally, after a brief predetermined delay, imaging device 135 produces at 325 a temporary digital image of whatever target scene is currently being received from optical system 140. Note that controller 125 does not wait for a continue command in this particular embodiment. The temporary digital image is converted to a text file at 335, and controller 125 searches the text file for the text pattern that was acquired at 310. If the text pattern is not recognized, control proceeds to 365. If no terminate command is received at 365, control returns to 315. Otherwise, text-recognition mode is exited at 370.

If the text pattern is recognized at 335, a test is performed at 410 to ensure that the current target scene is different from the previous target scene for which a digital representation was saved in non-volatile memory 160. Such an approach allows the operations at 315, 325, 330, 335, and 410 to be performed in a loop, thereby freeing the user from the need to indicate via user interface 105 when to take each successive photograph. Thus, in the embodiment associated with FIG. 4, digital camera 100 automatically determines when a new target scene is present and responds by capturing a digital image and saving a digital representation of the target scene in non-volatile memory 160, when the text pattern acquired at 310 is recognized. Hereinafter, a target scene for which a digital representation has been saved will be referred to as a "saved target scene." There are many ways apparent to those skilled in the art in which the test at 410 may be implemented. In the particular embodiment associated with FIG. 4, the text files associated with the current and the previous saved target scenes are compared. Examples of comparison techniques include comparing the position of the text pattern acquired at 310 in the current text file to its position in the text associated with the previous saved target scene. Another solution is to compare the text immediately surrounding the text pattern acquired at 310 in the two text files. Other solutions include identifying and comparing page numbers within the text files or comparing the first few words of the text in the two text files. Still another solution is to compare message digests of the two text files computed using, for example, a digital hashing function such as MD5. In some implementations, direct comparison of the digital images associated with the current and the previously saved target scenes may be advantageous.

If the text pattern at 410 is recognized for the first time since the activation of text-recognition mode, there is no previous text with which to compare, so control automatically proceeds to 340, where an audible tone is emitting signaling that the text pattern has been recognized. From 355, control proceeds as explained in connection with FIG. 3.

The present invention may be modified to combine elements of manual confirmation and automation in ways different from that indicated in FIG. 3 and FIG. 4 without departing from the principles of the invention.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for initiating data capture in a digital camera, the method comprising:

activating a text-recognition mode in the digital camera;

acquiring in the digital camera a text pattern to be recognized;

selecting a first target scene at which to aim the digital camera;

capturing a first digital image of the first target scene;

converting the first digital image to a first text file; and searching the first text file for the text pattern.

2. The method of claim 1, further comprising:

saving a digital representation of the first target scene, when the text pattern is recognized.

3. The method of claim 2, wherein the digital representation comprises the first text file.

4. The method of claim 2, wherein the digital representation comprises a digital image.

5. The method of claim 2, wherein selecting a first target scene at which to aim the digital camera, capturing a first digital image of the first target scene, converting the first digital image to a first text file, searching the first text file for the text pattern, and saving a digital representation of the first target scene, when the text pattern is recognized, are repeated until a command to terminate the text-recognition mode is received.

6. The method of claim 5, further comprising:

receiving a continue command in the digital camera after selecting a first target scene at which to aim the digital camera and prior to capturing a first digital image of the first target scene.

7. The method of claim 5, wherein saving a digital representation of the first target scene is performed for each subsequent target scene for which the text pattern is recognized and the first text file associated with the current target scene differs from the first text file associated with the previous target scene for which a digital representation was saved.

8. The method of claim 1, wherein acquiring in the digital camera a text pattern to be recognized comprises scrolling within a displayed list of alphanumeric characters and selecting alphanumeric characters from the displayed list that specify the text pattern.

9. The method of claim 1, wherein acquiring in the digital camera a text pattern to be recognized comprises the use of speech recognition.

10. The method of claim 1, wherein acquiring in the digital camera a text pattern to be recognized comprises retrieving a previously saved text pattern.

11. The method of claim 1, further comprising:

signaling when the text pattern is recognized.

12. The method of claim 11, further comprising:

receiving a confirmation command in the digital camera;

capturing a second digital image of a second target scene; and saving a digital representation of the second target scene.

13. The method of claim 12, wherein the digital representation comprises a text file.

14. The method of claim 12, wherein the digital representation comprises a digital image.

15. The method of claim 11, further comprising:

capturing a second digital image of a second target scene after a predetermined delay; and saving a digital representation of the second target scene.

16. The method of claim 15, wherein the digital representation comprises a text file.

17. The method of claim 15, wherein the digital representation comprises a digital image.

18. A digital camera, comprising:

an optical system;

an imaging device for receiving from the optical system an optical image of a target scene to be photographed and converting the received optical image to a digital image;

a memory for storing the digital image;

an optical character recognition module for converting the digital image to a text file;

a device for acquiring a text pattern to be searched within the text file; and a controller for determining when the text pattern is recognized.

19. The digital camera of claim 18, further comprising:

an audible tone generator for signaling when the text pattern is recognized.

20. The digital camera of claim 18, further comprising:

an image compression module for producing a compressed digital image from the digital image.

21. A digital camera, comprising:

means for collecting an optical image;

means for converting the optical image to a digital image;

means for storing the digital image;

means for converting the digital image to a text file; and means for acquiring in the digital camera a text pattern to be searched within the text file.

22. The digital camera of claim 21, further comprising:

means for saving the text file when the text pattern is recognized.

23. The digital camera of claim 21, further comprising:

means for compressing the digital image to produce a compressed digital image;

means for saving the compressed digital image when the text pattern is recognized.

24. The digital camera of claim 21, further comprising:

means for signaling when the text pattern is recognized.

* * * * *